United States Patent
Weir et al.

(10) Patent No.: US 6,805,803 B1
(45) Date of Patent: Oct. 19, 2004

(54) PROCESS FOR FLOCCULATING SUSPENSIONS

(75) Inventors: Steven Weir, Huddersfield (GB); Mark John Stringer, Leeds (GB)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 53 days.

(21) Appl. No.: 10/030,535

(22) PCT Filed: Jul. 5, 2000

(86) PCT No.: PCT/EP00/06292

§ 371 (c)(1),
(2), (4) Date: Jan. 9, 2002

(87) PCT Pub. No.: WO01/05712

PCT Pub. Date: Jan. 25, 2001

(30) Foreign Application Priority Data

Jul. 19, 1999 (GB) .............................. 9916748

(51) Int. Cl.[7] .................................. C02F 11/14

(52) U.S. Cl. ................. 210/728; 210/734; 210/738; 210/928; 252/180; 422/901; 524/922

(58) Field of Search ............................ 210/705, 725, 210/727, 728, 734, 738; 422/901; 524/922, 928; 252/180

(56) References Cited

U.S. PATENT DOCUMENTS

| 3,509,021 | A | * | 4/1970 | Woodward | 162/167 |
| 3,951,792 | A | * | 4/1976 | Azorlosa et al. | 210/728 |
| 3,994,806 | A | * | 11/1976 | Rausch et al. | 210/728 |
| 4,402,916 | A | * | 9/1983 | Luetzelschwab | 422/256 |
| 4,835,206 | A | * | 5/1989 | Farrar et al. | 524/457 |
| 4,931,190 | A | | 6/1990 | Laros | 210/710 |
| 5,213,693 | A | * | 5/1993 | McGrow et al. | 210/728 |
| 5,284,627 | A | * | 2/1994 | Brazelton et al. | 422/135 |
| 5,846,433 | A | * | 12/1998 | Sorensen et al. | 210/709 |
| 6,001,920 | A | * | 12/1999 | Ghafoor et al. | 524/500 |

FOREIGN PATENT DOCUMENTS

| DE | 3020685 | 12/1981 |
| WO | 88/00927 | 2/1988 |
| WO | 95/33697 | 12/1995 |

* cited by examiner

Primary Examiner—Peter A. Hruskoci
(74) Attorney, Agent, or Firm—Kevin T. Mansfield (57) ABSTRACT

A process of flocculating and dewatering an aqueous suspension of suspended solids comprising, introducing into the suspension, (a) a concentrated polymer solution and, (b) a dilute polymer solution, characterised in that the concentrated and dilute polymer solutions are introduced into the substrate substantially simultaneously. Preferably the concentrated and dilute polymer solutions are introduced into the suspension as an aqueous composition comprising a dilute aqueous solution of polymer and a concentrated solution of polymer. The process brings about improvements in filtration and cake solids.

17 Claims, 6 Drawing Sheets

PROCESS FOR FLOCCULATING SUSPENSIONS

This invention relates to processes of flocculating aqueous suspensions in order to effect separation of solids from said suspension.

It is well known to apply polymeric flocculants to aqueous suspensions in order to separate solids from the suspension. For instance it is common practice to flocculate and then dewater suspensions containing either suspended solid organic material or mineral solids. For instance it is common practice to flocculate sludges such as sewage sludge, waste waters, textile industry effluents, red mud from the Bayer Alumina process and suspensions of coal tailings etc. Flocculants are also commonly used in paper-making processes by addition of polymeric flocculants to the cellulosic suspension. Flocculation is usually achieved by mixing into the suspension polymeric flocculant, allowing the suspended particles to flocculate and then dewatering the flocculated suspension. In papermaking this removal of water from the cellulosic suspension is often referred to as draining.

High molecular weight polymeric flocculants are commonly used for this purpose. High molecular weight flocculants may be cationic, anionic, nonionic or amphoteric in nature. The choice of polymeric flocculant will largely depend upon the susbstrate, which is being treated. For instance it is common practice to use high molecular weight cationic flocculants to treat aqueous suspensions comprising suspended organic material, for instance sewage sludge. In paper-making it is known to use either cationic, nonionic, anionic or amphoteric flocculants. Flocculation of mineral suspensions is frequently effected by use of anionic flocculants.

It is also known to use two different polymeric flocculants in the same process. The flocculants may have the same charge (co-ionic). For instance in commercial practice in the dewatering sewage sludge these may be co-ionic. In other processes it is known to apply two polymers of opposite charge (counter-ionic). Where two polymeric flocculants are applied to an aqueous suspension they may be added to simultaneously or more usually sequentially.

It is standard practice to apply polymers as aqueous solutions to flocculate suspensions containing suspended organic material. Generally the solutions of polymers are relatively dilute, for instance below 0.5%, often below 0.3% and usually 0.1% to below 0.2% by weight.

Polymers are usually provided as a solid particulate product or as a reverse phase dispersion or emulsion. It is standard practice to dissolve the polymer into water by dispersing the polymer particles in a flowing stream of water in the case of the solid particulate product or in the case of the emulsion or dispersion, inversion into water, by use of activator surfactants. The polymer solution thus formed is frequently at a concentration above 0.3%, often in the range 0.4% to 1% and usually about 0.5%. This more concentrated solution of polymer may be too concentrated to add directly to the suspension in many instances, since received wisdom suggests that there would be inadequate distribution of the flocculant throughout the suspension and as a consequence the flocculation process would be impaired.

It is therefore common practice to first of all provide a more concentrated solution of polymer and then dilute the polymer solution prior to application. Often the diluted solution will have a concentration of below 0.2%, for instance within the range 0.05 to 0.2% by weight and frequently between 0.1 and 0.2% by weight. This dilute solution of polymer is normally metered directly into the suspension prior to the dewatering stage.

There is a desire to improve the efficiency of the flocculation processes, to either bring about an increased dewatering effect, such as higher cake solids or in the alternative achieve a constant acceptable level of dewatering efficiency but using a lower dose of flocculant. This is true in a variety of flocculation processes, including dewatering of sewage sludge, slurries of coal tailings, red mud and in papermaking.

It would therefore be desirable to provide an improved method of flocculating and dewatering aqueous suspensions of solids, in particular to provide increased dryness of the dewatered solids for an equivalent dose of flocculant or to provide the same degree of dryness of dewatered solids but using a reduced dose of flocculant. It would also be desirable to provide a process which provides faster dewatering.

The invention relates to a process of flocculating and dewatering an aqueous suspension of suspended solids comprising, introducing into the suspension, (a) a concentrated polymer solution and,
(b) a dilute polymer solution, characterised in that the concentrated and dilute polymer solutions are introduced into the substrate substantially simultaneously.

The concentrated and dilute solutions may be metered directly into the suspension as separate solutions. By substantially simultaneously the two solutions should be added at approximately the same dosing point. Where the concentrated and dilute solutions are added to the suspension separately, they may be added in either order. For instance if the dilute solution is added first the concentrated polymer may be added after flocculation has commenced but should be added before the dewatering stage and before any high shear stage, such as pumping or screening stages. Alternatively, it may be desirable to add the dilute polymer solution after the addition of the concentrated polymer solution. When the dilute and concentrated polymer solutions are added separately it may be appropriate to allow or apply some degree mixing between the dosing stages in order to allow the first polymer dose to become distributed throughout the suspension solids. This mixing may for instance include allowing the treated suspension to pass some distance along a flow line which optionally contains bends, baffles, constrictions or other features which induce gentle mixing.

Preferably the concentrated and dilute polymer solutions are introduced simultaneously.

More preferably the concentrated and dilute polymer solutions are introduced into the suspension as an aqueous composition comprising a dilute aqueous solution of polymer and a concentrated solution of polymer. The aqueous composition should comprise both the dilute and the concentrated polymer solutions as discrete components. Thus it is desired that the dilute solution and concentrated solution exist as substantially discrete components of the aqueous composition.

The aqueous composition preferably comprises the dilute aqueous solution of polymer in an amount of from 20 to 99%, based on weight of polymer, and the concentrated polymer solution in an amount of from 1 to 80%, based on weight of polymer. For some applications, such as for rotary vacuum filtration coal tailings slurries it may be appropriate to use a ratio of concentrated solution to dilute polymer solution of around 75:25. However in most other applications the ratio of concentrated polymer solution to dilute polymer solution would generally in the range 1:99 to 40:60.

The aqueous composition comprising concentrated and dilute solutions may be of any significantly different concentrations provided that the respective concentrations are not substantially the same such that the two solutions would immediately form a homogenous single solution. Preferably the concentrated solution should be at least twice the concentration of the diluted solution. More preferably the concentrated solution should be at least 4 or 5 times the concentration of the dilute aqueous solution.

The dilute aqueous solution of polymer desirably has a concentration of polymer of below 0.5%, preferably below 0.3% by weight. More preferably the concentration of the dilute solution is in the range 0.05 to 0.2%, most preferably around 0.1% by weight.

According to the invention the polymer dissolved in the dilute aqueous polymer solution may be either cationic, anionic or non-ionic.

The concentrated aqueous solution component according to the invention desirably has a concentration of polymer above 0.3% by weight, preferably between 0.4 and 1.0% by weight. More preferably the concentration of the concentrated solution is in the range 0.5 to 1.0%. According to the invention the polymer dissolved in the concentrated aqueous polymer solution may be either cationic, anionic or non-ionic. The polymer dissolved in the concentrated polymer solution is preferably either co-ionic with the polymer dissolved in the dilute solution or non-ionic. In another preferred form the polymer dissolved in the dilute solution is non-ionic and the polymer dissolved in the concentrated polymer solution is cationic, anionic or non-ionic.

When the polymer dissolved in either the dilute solution or concentrated solution is cationic, said cationic polymer may be formed by polymerisation of at least one cationic monomer alone or with other monomers. Suitable cationic monomers include quaternary ammonium or acid salts of monomers which contain amine groups. Preferably the cationic polymer is formed from a monomer or blend of monomers comprising at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride. The cationic monomers may be hompolymerised or copolymerised with other monomers, for instance acrylamide. In addition to vinyl addition polymers, the cationic polymer may include polymers obtained by condensation or addition reactions. For instance suitable cationic polymers include adducts of amines with epihalohydrins or dihaloalkanes, polyamides and polyethylene.

In the case where the polymer dissolved in either the dilute solution or concentrated solution is anionic, said anionic polymer may be formed by polymerisation of at least one anionic monomer alone or with other monomers. Suitable anionic monomers include ethylenically unsaturated monomers comprising carboxylic acid or sulphonic acid groups. Preferably the anionic polymer is formed from a monomer or blend of monomers comprising at least one anionic monomer selected from the group consisting of (meth) acrylic acid, 2-acrylamido-2-methylpropane sulphonic acid, alkali metal and ammonium salts thereof.

If the polymer dissolved in either the dilute solution or concentrated solution is nonionic, said anionic polymer may be formed by polymerisation of suitable non-ionic monomers, for instance acrylamide or methacrylamide.

The polymers suitable for both the concentrated aqueous solution and dilute aqueous solution may be prepared by any convenient polymerisation process, for instance gel polymerisation, reverse phase suspension polymerisation, reverse phase emulsion polymerisation, solution polymerisation and the like. Thus suitable polymers may be provided in the form of granulated powders, beads, reverse phase emulsions, reverse phase dispersions or aqueous solutions.

The concentrated aqueous solution may be formed by dissolving any suitable water soluble polymer into water. The dilute aqueous solution of polymer may also be prepared by dissolving any suitable water soluble polymer into water or alternatively by diluting a more concentrated solution of the polymer solution. The respective concentrated and dilute aqueous solutions may be produced therefrom by known dissolution, inversion or dilution techniques as appropriate. For instance solid particulate cationic polymer may be dissolved by dispersing the polymer particles into a flowing stream of water. Reverse phase emulsions or reverse phase dispersions of cationic polymers may be inverted into water by use of activator surfactants to form the respective aqueous solutions. Preferably the polymers dissolved in both the dilute and concentrated solutions are essentially the same polymer.

The polymers according to the invention may be prepared as substantially linear polymers or as branched or structured polymers. Structured or branched polymers are usually prepared by inclusion of polyethylenically unsaturated monomers, such as methylene-bis-acrylamide into the monomer mix, for instance as given in EP-B-202780. Preferably however, the polymers are substantially linear and are prepared in the form of a bead or powdered product.

A particularly preferred group of polymers includes copolymers of acrylamide with at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride, having an intrinsic viscosity of at least 4 dl/g. The cationic acrylamide polymers may comprise 10 to 90% by weight acrylamide and 10 to 90% by weight cationic monomer(s).

The aqueous composition comprising the dilute aqueous solution of cationic polymer and the concentrated solution of cationic polymer may be formed by introducing the concentrated solution of cationic polymer into a flowing stream of the dilute aqueous solution of cationic polymer. For instance in one method of preparing the aqueous composition a concentrated aqueous solution of cationic polymer is introduced directly into a conduit through which the dilute aqueous solution of cationic polymer is being conveyed towards the dosing point where the aqueous composition comprising both concentrations of polymer are metered into the suspension of solids in order to effect flocculation.

According to a preferred form of the invention wherein an aqueous suspension of suspended solids is flocculated and dewatered, an aqueous composition is introduced into the suspension. The aqueous composition comprises concentrated and dilute aqueous solutions of cationic polymer wherein the two solutions exist as discrete components of the composition. It is considered desirable that the mixture of concentrated and dilute solutions exist together as a non-homogenous composition. Therefore, in order to prevent the concentrated solution from dissipating and being diluted thus forming a homogenous solution of polymer at a single concentration, it is desirable to substantially reduce any mixing of the aqueous composition prior to being introduced into the suspension. One way that undesirable mixing of the aqueous composition can be avoided is by ensuring that there are no mixing or pumping stages after the concentrated and dilute solutions have been combined. In addition it may further be desirable for the conduit to have a relatively smooth inner surface and the avoidance short radius bends, for example as given in pending International Application No. PCT/GB 99/00990. Another way that undesirable mixing can be avoided is to reduce the distance the aqueous composition has to travel by combining the concentrated and dilute solutions relatively close to the dosing point.

It is desirable that the aqueous composition comprising dilute and concentrated solutions does not contain substantial amounts of undissolved polymer, for instance it is preferable that less than 5%, more preferably less than 2% by weight of total polymer contained in the aqueous composition is not in solution. In many dewatering situations the most efficient use of the polymer is achieved if the amount of undissolved polymer is less than 1%, especially less than 0.5%.

The dilute solution of cationic polymer may conveniently be prepared by dilution of a more concentrated solution of the polymer. This can be achieved by adding dilution water to a flowing stream of more concentrated solution of polymer. For instance it may be desirable to pass the more concentrated solution of cationic polymer along a conduit to a dilution stage, where dilution water is introduced into the concentrated solution. In order to achieve adequate mixing of the concentraed solution with the water so that a homogenous consistent dilute solution is obtained it may be necessary to introduce a mixing stage. The mixing stage may be for instance an in-line mixing stage, such as an in-line static mixer, a pumping stage, a screening stage or some other means that can ensure adequate mixing. Preferably once thoroughly mixed the diluted solution will be substantially homogenous.

A particularly preferred aspect of the invention relates to a process of flocculating and dewatering an aqueous suspension of suspended solids by introducing into the suspension an aqueous composition comprising concentrated and dilute polymer solutions wherein the aqueous composition is formed by, (a) passing a concentrated solution of polymer to a dilution stage where the solution is combined with dilution water to form a dilute solution, (b) passing the diluted solution through a mixing stage, selected from an in-line mixer, a pumping stage and screening stage, and (c) introducing a concentrated solution of polymer into the dilute aqueous solution.

The concentrated polymer solution, which is diluted to form the dilute polymer solution may be drawn from the same reservoir of concentrated polymer solution which is subsequently combined with the dilute solution in forming the said aqueous composition according to the invention. There may be some mixing of the dilute and concentrated polymer solutions provided that this does not result in the aqueous composition becoming substantially homogenous.

Thus in a particularly preferred process for preparing the aqueous composition a concentrated aqueous solution of cationic polymer contained in a holding vessel is passed through a conduit to a dilution stage and subsequent mixing stage thus providing the dilute aqueous solution. Concentrated aqueous solution of cationic polymer contained in the holding vessel from said holding vessel is passed by means of a second conduit directly into the dilute aqueous solution of cationic polymer. A typical arrangement for carrying out the preparation of the aqueous composition according to this aspect of the invention is shown in FIG. 1.

Figure 1:
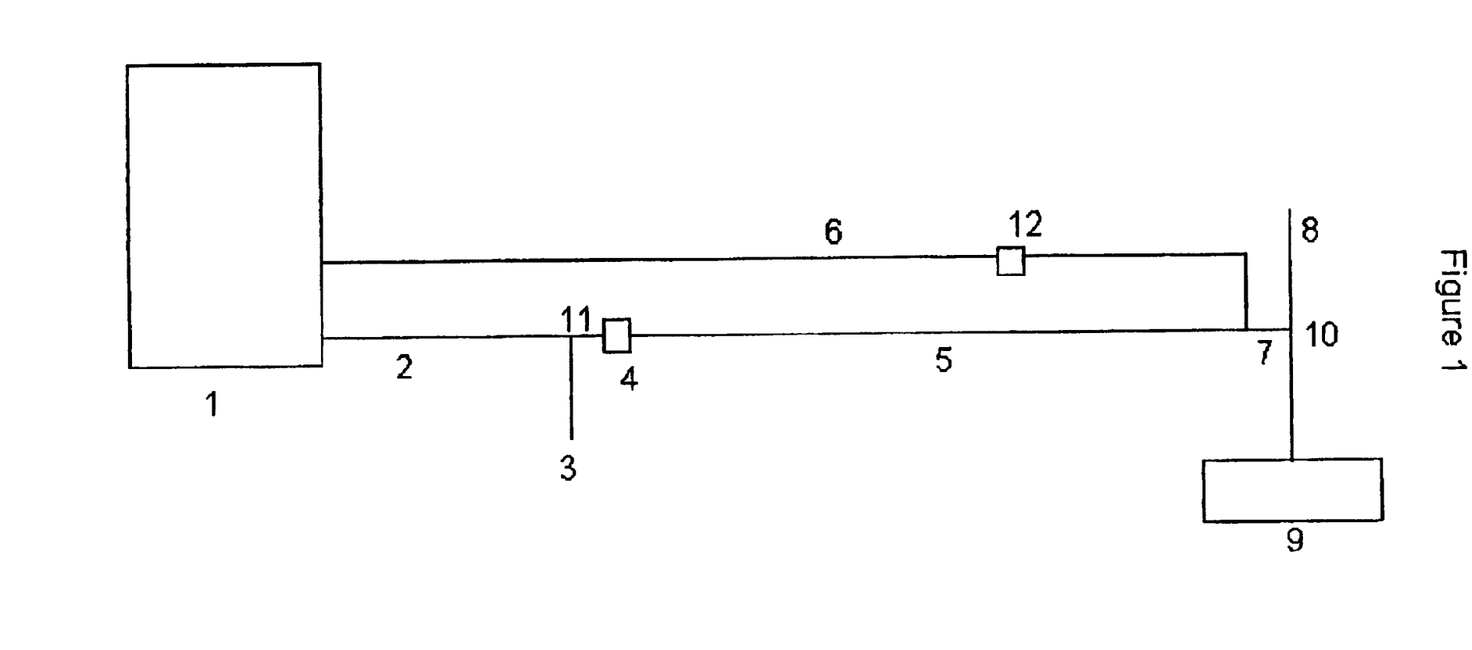

In FIG. 1 the following key applies,
[1] Holding vessel containing concentrated cationic polymer solution
[2] Conduit conveying concentrated cationic polymer solution to dilution stage
[3] Dilution water line
[4] Pump
[5] Conduit conveying dilute cationic polymer solution
[6] Conduit conveying concentrated polymer solution
[7] Aqueous composition comprising concentrated and dilute aqueous solutions of cationic polymer
[8] Sewage sludge line
[9] Dewatering stage
[10] Dosing point of aqueous composition into the sludge
[11] Dilution stage
[12] Pump Thus in the scheme represented in FIG. 1, aqueous concentrated cationic polymer solution is held in holding vessel [1]. Concentrated polymer solution is passed along conduit [2] towards dilution stage [11] after which the aqueous polymer solution and dilution water passed through a pump [4] where they are mixed together to ensure that a consistent diluted polymer solution is formed. The dilute aqueous polymer solution is passed along conduit [5] towards the point where concentrated polymer solution is added. A second conduit [6] from holding vessel [1] conveys concentrated cationic polymer solution into the dilute polymer solution to form the aqueous composition [7] which is passed to the dosing point [10] where the mixture of concentrated and dilute cationic polymer solutions are metered into the sewage sludge line [8]. The treated sewage sludge is then passed into the dewatering stage [9].

Alternatively the concentrated polymer solution which is combined with the dilute aqueous polymer solution may be drawn from a separate reservoir of concentrated polymer solution from that which is diluted to form the dilute aqueous polymer solution. Thus in this alternative form of the invention the opportunity exists for the concentrated polymer being a different polymer from the polymer in the dilute aqueous solution. For instance it may be desirable to combine a concentrated solution of a low molecular weight cationic polymer, having an intrinsic viscosity of below 3 dl/g, with a dilute solution of a high molecular weight cationic polymer, having an intrinsic viscosity of at least 4 dl/g. The low molecular weight polymer may be a coagulant, for instance the hompolymer of diallyldimethyl ammonium chloride. The high molecular weight polymer may be a bridging flocculant, for example a copolymer of acrylamide with a suitable cationic monomer, such as the quaternary ammonium salt of dimethylaminoethyl (meth) acrylate. A typical arrangement for conducting this alternative aspect of the invention is shown in FIG. 2.

Figure 2:
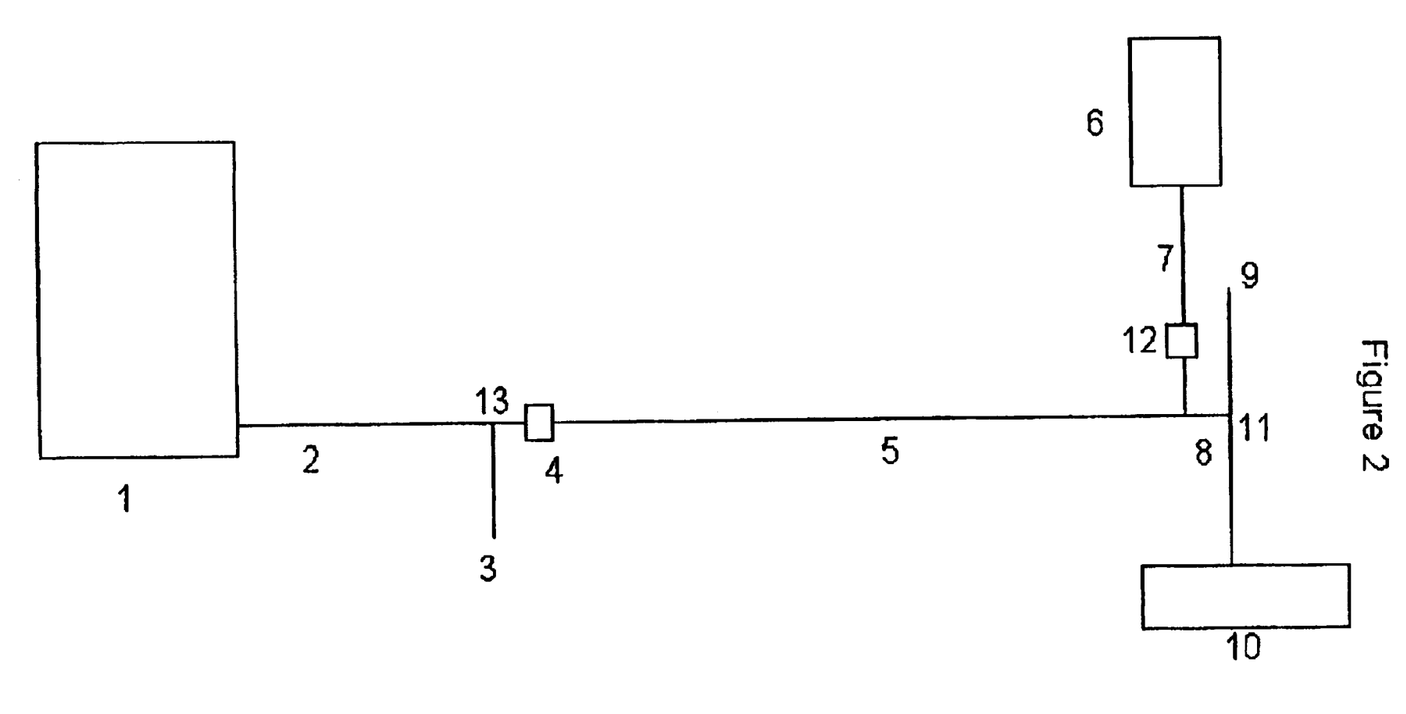

In FIG. 2 the following key applies, [1] Holding vessel containing concentrated cationic polymer solution [2] Conduit conveying concentrated cationic polymer solution to dilution stage [3] Dilution water line [4] Pump [5] Conduit conveying dilute cationic polymer solution [6] Second holding vessel for concentrated cationic polymer solution [7] Conduit conveying concentrated polymer solution [8] Aqueous composition comprising concentrated and dilute aqueous solutions of cationic polymer [9] Sewage sludge line [10] Dewatering stage [11] Dosing point of aqueous composition into the sludge [12] Pump [13] Dilution stage Thus in the scheme represented in FIG. 2, aqueous concentrated cationic polymer solution is held in holding vessel [1]. Concentrated polymer solution is passed along conduit [2] towards dilution stage [13] after which the aqueous polymer solution and dilution water are passed through a pump [4] where they are mixed together to ensure that a consistent diluted polymer solution is formed. The dilute aqueous polymer solution is passed along conduit [5] towards the point where concentrated polymer solution is added. A second conduit [7] passes concentrated aqueous cationic polymer solution from holding vessel [6] into the dilute polymer solution to form the aqueous composition [8] which is passed to the dosing point [11] where the mixture of concentrated and diluted cationic polymer solutions are metered into the sewage sludge line [9]. The treated sewage sludge is then passed into the dewatering stage [10].

The invention is suited to a variety of processes involving flocculation and dewatering. Processes of particular relevance include dewatering sewage sludges, dewatering mineral suspensions, dewatering of paper mill sludges, dewatering of deinked cellulosic sludges e.g. from paper deinking plants and also papermaking processes.

The following examples serve to illustrate the invention.

EXAMPLE 1

Aqueous solutions of a copolymer of acrylamide with dimethylaminoethyl acrylate, methyl chloride quaternary ammonium (40/60 weight/weight), intrinsic viscosity at least 10dl/g, are prepared at 0.1, 0.125 and 0.5% concentration. Composition 1 is prepared by introducing a 0.1% solution into 0.5% solution on a 50/50 weight/weight basis. Composition 2 is prepared in a similar manner to composition 1 by combining a 0.1% solution with 0.5% solution on a 75/25 weight/weight basis.

200 ml aliquots of Rotherham (Yorkshire, England) sewage sludge are treated with dilute polymer (0.1%) and (0.125%), concentrated polymer (0.5%) and using composition 1 and composition 2 each at various doses of cationic polymer. The treated sludge is mixed at 2000 rpm for 15 seconds. The flocculation efficiency is measured by free drainage using a 10 cm diameter sieve.

The free drainage results are shown in Table 1.

TABLE 1

| Polymer solution | 5 second filtrate volume (ml) for each dose | | |
|---|---|---|---|
| | 137.5 mg/l | 150 mg/l | 162.5 mg/l |
| 0.1% | 10.5 | 31 | 55 |
| 0.125% | 4 | 24 | 50 |
| 0.5% | — | 27 | 49 |
| Composition 1 | 19 | 41 | 79 |
| Composition 2 | 14 | 32 | 67 |

The results clearly show the advantage of using the compositions comprising a mixture of concentrated and dilute solutions of the cationic polymer.

EXAMPLE 2

Example 1 is repeated, except using polymer solutions 0.1%, 0.167% and 0.5% and mixed composition of 0.1% and 0.5% (50/50) and using 250 ml aliquots of Rotherham sewage sludge and subjecting the treated sludge to mixing at 7000 rpm for 15 seconds. The flocculation efficiency is measured by free drainage using a 8 cm diameter sieve. For each test the volume of filtrate is measured and adjusted to allow for the volume of each aqueous polymer dose.

The adjusted free drainage results are shown in Table 2.

TABLE 2

| Polymer solution | 5 second filtrate volume (ml) for each dose | | | | |
|---|---|---|---|---|---|
| | 100 mg/l | 120 mg/l | 140 mg/l | 160 mg/l | 180 mg/l |
| 0.1% | 73 | 116 | 159 | 166 | 149 |
| 0.167% | 71 | 114 | 163 | 174 | 165 |
| 0.5% | 79 | 124 | 165 | 176 | 165 |
| (50/50) mixture of 0.1% and 0.5% polymer solutions | 83 | 166 | 167 | 166 | 155 |

The results clearly show that optimum drainage is achieved using a lower dose of the blend of 0.1% and 0.5% polymer solutions than any of the other treatments.

EXAMPLE 3

Example 2 is repeated using a copolymer of acrylamide with dimethylaminoethyl acrylate, methyl chloride quaternary ammonium (80/20 weight/weight), intrinsic viscosity at least 10 dl/g prepared as a reverse phase emulsion, which has been dehydrated to form a liquid dispersion product and inverted in water to form aqueous solutions of the polymers at various concentrations. These polymer solutions are tested using 500 ml aliquots of Rotherham sewage sludge which has been diluted with water (2 parts sludge to 3 parts water) and subjecting the treated sludge to mixing at 1000 rpm (low shear) for 15 seconds. The flocculation efficiency is measured by free drainage using a 8 cm diameter sieve. The adjusted free drainage results are shown in Table 3.

TABLE 3

| Polymer solution | 5 second filtrate volume (ml) for each dose | | | | | |
|---|---|---|---|---|---|---|
| | 30 mg/l | 40 mg/l | 50 mg/l | 60 mg/l | 70 mg/l | 80 mg/l |
| 0.1% | 175 | 181 | 246 | 290 | 296 | 270 |
| 0.167% | 121 | 158 | 246 | 302 | 308 | 256 |
| 0.5% | 157 | 206 | 256 | 314 | 303 | 262 |
| (50/50) mixture of the 0.1% and 0.5% polymer solutions | 131 | 158 | 285 | 322 | 308 | 256 |

Figure 3:
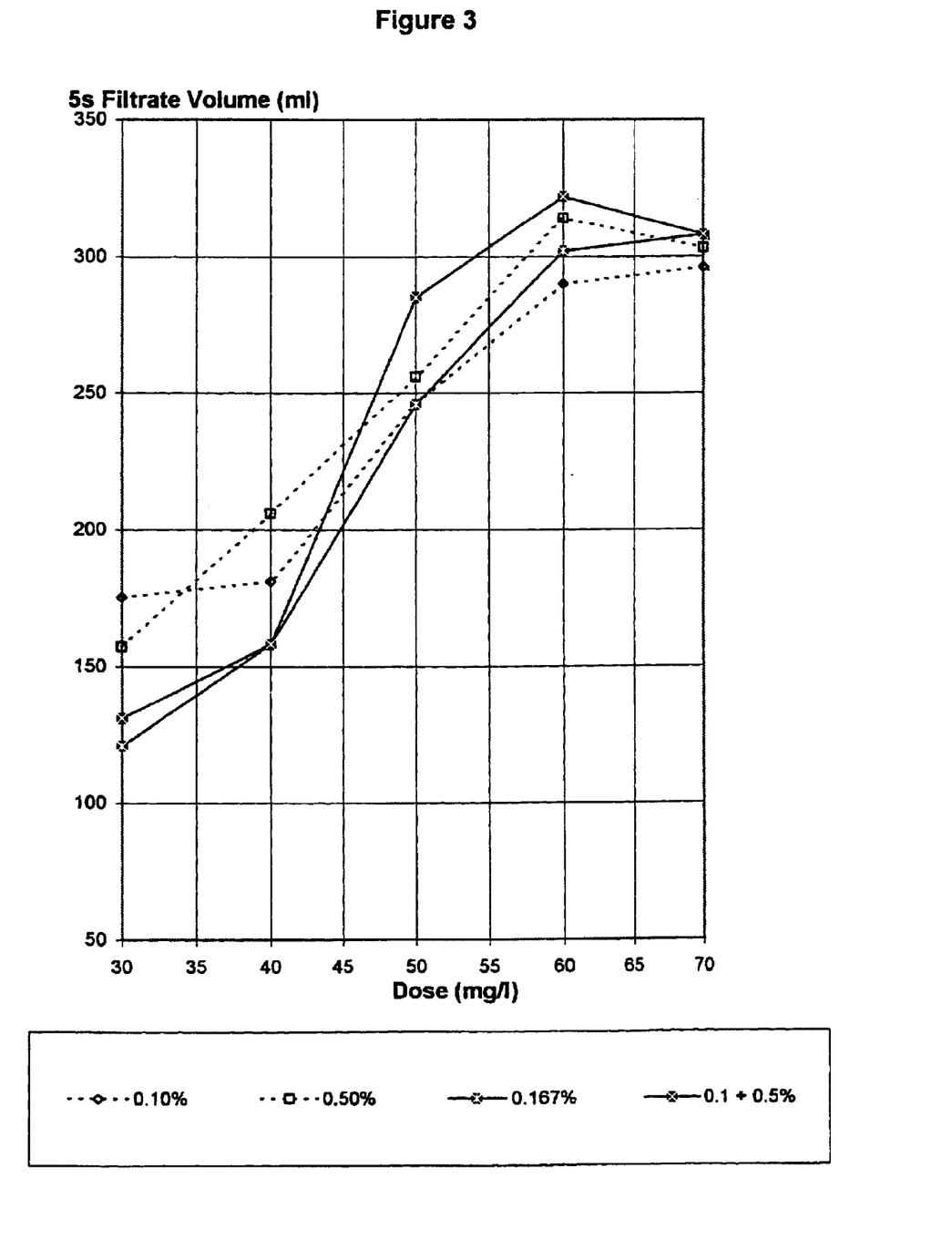

The results clearly demonstrates that the blend of polymer solutions give an increased optimum drainage by comparison to the other treatments. This is visible from the plot of these results shown in FIG. 3.

EXAMPLE 4

Example 3 is repeated except the polymer has been prepared according to the teaching of EP-A-202780 by including about 20 ppm methylenebisacrylamide with the monomer resulting in a cross-linked polymer, which exhibits an ionic regain of 40%. The treatment is as described in example 3, except the treated sludge is subjected to mixing at 4,000 rpm the flocculation efficiency is measured by free drainage using an 8 cm sieve.

The free drainage results adjusted for dose volume are shown in Table 4.

TABLE 4

| Polymer solution | 5 second filtrate volume (ml) for each dose ||||||
| --- | --- | --- | --- | --- | --- | --- |
| | 90 mg/l | 100 mg/l | 110 mg/l | 120 mg/l | 130 mg/l | 140 mg/l |
| 0.1% | 195 | 260 | 345 | 350 | 345 | |
| 0.167% | 223 | 320 | 347 | 364 | 361 | 347 |
| 0.5% | 221 | 320 | 369 | 370 | 382 | 376 |
| (50/50) mixture of the 0.1% and 0.5% polymer solutions | 303 | 360 | 387 | 393 | 370 | |

Figure 4:
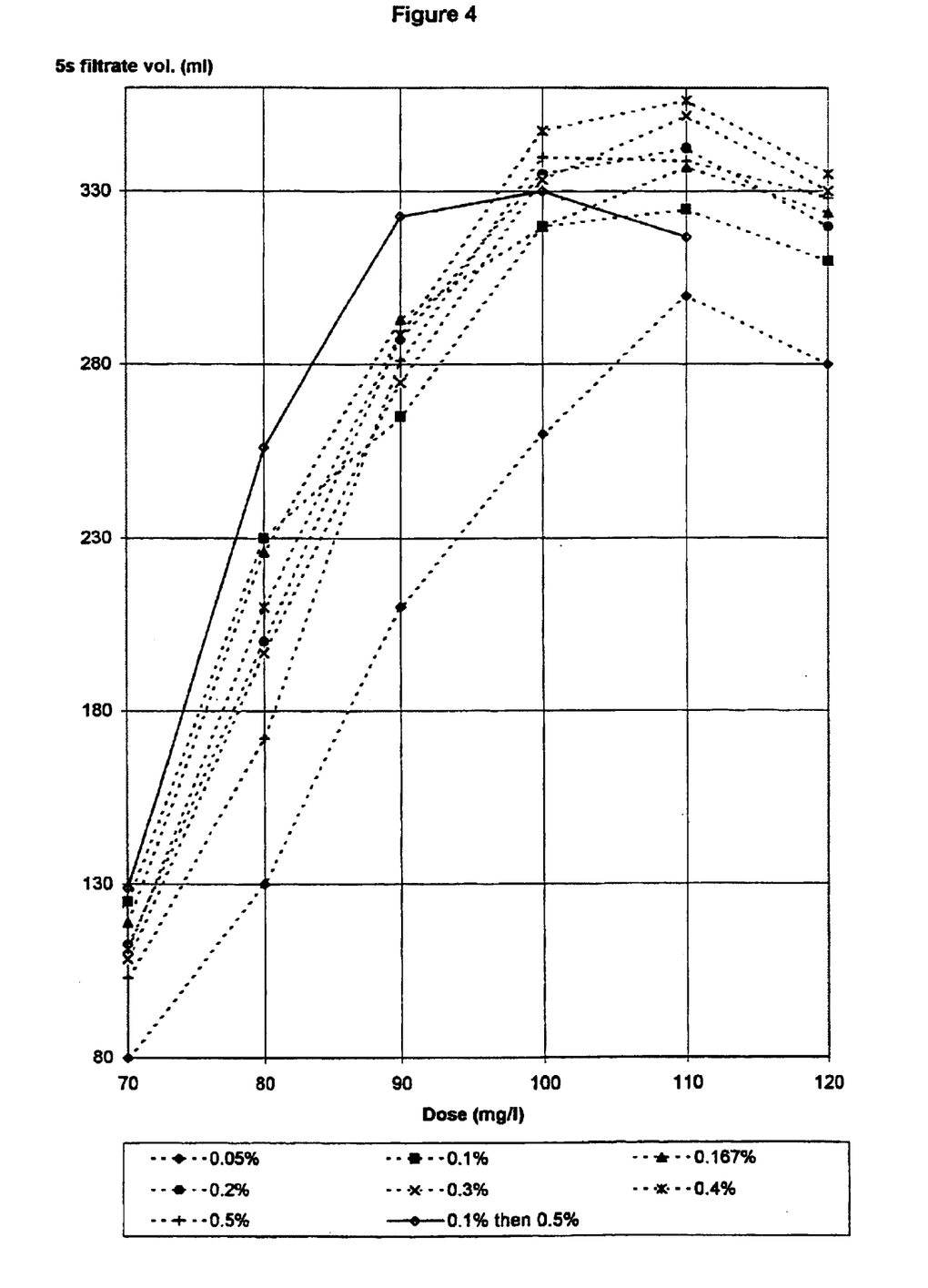

The results clearly demonstrate that the blend of polymer solutions and separate and sequential treatment of different concentrations exhibit on the whole improved drainage by comparison to the other treatments. A plot of these results is shown in FIG. 4.

EXAMPLE 5

Example 3 is repeated except the treatment comprising the mixture of 0.1% and 0.5% polymer solutions is replaced by sequential dosing of the 0.1% and 0.5% polymer solutions, wherein the 0.1% solution is added first, followed by mixing for 5 seconds at 4,000 rpm and then applying the 0.5% polymer solution, followed by further mixing for 15 seconds at 4,000 rpm and then draining through an 8 cm sieve.

The free drainage results adjusted for dose volume are shown in table 5

TABLE 5

| Polymer solution | 5 second filtrate volume (ml) for each dose (Total Polymer Dose) ||||||
| --- | --- | --- | --- | --- | --- | --- |
| | 70 mg/l | 80 mg/l | 90 mg/l | 100 mg/l | 110 mg/l | 120 mg/l |
| 0.05% | 80 | 130 | 210 | 260 | 300 | 280 |
| 0.1% | 125 | 230 | 265 | 320 | 325 | 310 |
| 0.167% | 119 | 226 | 293 | 320 | 337 | 324 |
| 0.2% | 113 | 200 | 288 | 335 | 342 | 320 |
| 0.3% | 108 | 197 | 275 | 333 | 352 | 330 |
| 0.4% | 111 | 210 | 289 | 347 | 356 | 335 |
| 0.5% | 103 | 172 | 281 | 340 | 339 | 328 |
| sequential dosing of 0.1% and 0.5% polymer solutions | 129 | 246 | 314 | 330 | 331 | |

The results clearly demonstrate that effective dewatering of the sludge can be achieved using lower total polymer dose by applying dilute and concentrated polymer solutions by comparison to the other treatments employing single concentration polymer solutions. Thus the mixed concentration dosing enables more efficient dosing of the polymer.

EXAMPLE 6

Aqueous solutions of a copolymer of acrylamide with dimethylaminoethyl acrylate, methyl chloride quaternary ammonium (75/25 weight/weight), intrinsic viscosity at least 10 dl/g, are prepared at 0.1, 0.125 and 0.5% concentration. A mixture of 0.1% and 0.5% solution as a weight ratio of 75:25 is also prepared.

Dewatering of a de-inked paper mill sludge (0.91% solids) was evaluated using the polymer solutions at various doses. For each test the polymer was dosed to 600 ml of sludge, followed by stirring for 15 seconds at 2000 rpm using a 4 blade stirrer. The flocculation efficiency was measured using free drainage through an 8 cm sieve recording filtrate volume after 5 seconds. The free drainage results, adjusted to take into account the dose volumes are shown in table 6.

TABLE 6

| Polymer solution | 5 second filtrate volume (ml) for each dose |||
| --- | --- | --- | --- |
| | 1 Kg/t | 2 Kg/t | 4 Kg/t |
| 0.1% | 125.5 | 139 | 108 |
| 0.125% | 145.6 | 141.2 | 82.4 |
| 0.5% | 148.9 | 147.8 | 115.6 |
| 75:25 mixture of 0.1% solution and 0.5% solution | 145.6 | 161.2 | 102.4 |

As can be seen by the results of this test the mixture of dilute and concentrated polymers solutions provides improved optimum free drainage.

EXAMPLE 7

Example 6 was repeated except instead of measuring free drainage, the treated sludge was transferred to a piston press. Pressures of 20, 40, 60 and 80 pounds per square inch (psi) were applied in 2 minute increments.

The cake produced was then weighed wet and dry to calculate the cake solids.

The results are shown in table 7.

TABLE 7

| Polymer solution | Cake Solids % |||
| --- | --- | --- | --- |
| | 1 Kg/t | 2 Kg/t | 4 Kg/t |
| 0.1% | 25.15 | 26.94 | 30.83 |
| 0.125% | 31.82 | 29.84 | 33.09 |
| 0.5% | 42.93 | 26.56 | 31.24 |
| 75:25 mixture of 0.1% solution and 0.5% solution | 26.34 | 32.31 | 32.95 |

The results from examples 6 and 7 show that the mixed dilute and concentrated polymer solutions provide the best overall combination of free drainage and cake solids.

EXAMPLE 8

A suspension of China Clay is prepared and used 4% (weight/volume) in 2 g/l sodium chloride solution. The tests are carried out on 500 ml aliquots of the China Clay suspension and mixed with various doses of polymer solutions of specified concentrations at 500 rpm impeller speed. The duration of mixing is for 15 seconds for single doses and simultaneous doses.

The flocculated China Clay is for each test transferred to a 500 ml measuring cylinder immediately upon completing the mixing stage. The time taken for the solid liquid interface (mud line) to pass between the 3 cm and 8 cm level is measured. A sedimentation rate in cm/minute is calculated and shown for each total polymer dose in table 8.

In each test the polymer is a copolymer of acrylamide with sodium acrylate, with a monomer ratio by weight of 70:30.

TABLE 8

| Polymer solution | Sedimentation rate (cm/min) | | |
|---|---|---|---|
| | 3 mg/l | 4 mg/l | 5 mg/l |
| 0.05% | 21 | 40.7 | 57.1 |
| 0.0833% | 15 | 41.2 | 55.6 |
| 0.25% | 14.8 | 36.5 | 43.8 |
| 50:50 mixture of 0.05% solution and 0.25% solution | 27.2 | 55.9 | 83.6 |

Figure 5:
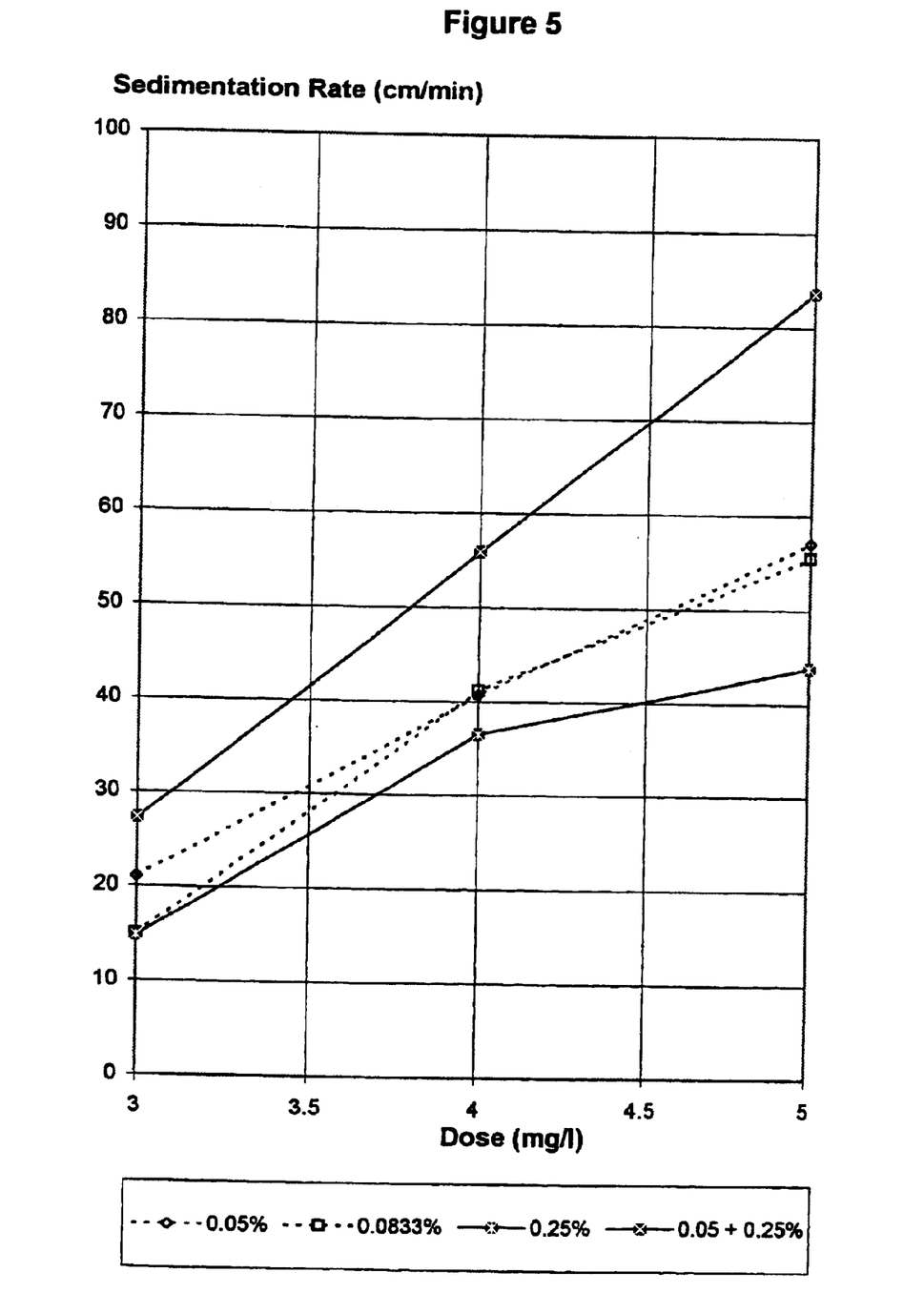

The results show that the mixed concentrated and dilute polymer solutions provide the best sedimentation rates. This is clearly shown in FIG. 5.

EXAMPLE 9

Example 8 is repeated comparing two stage addition of dilute and concentrated polymer solutions with simultaneous addition, two stage addition of two dilute solutions and single stage addition of a dilute solution.

The duration of mixing is and for 15 seconds for single doses and simultaneous doses and for the two stage dosing of concentrated and dilute polymer solutions, the first dose is applied followed by mixing for 5 seconds followed by the second dose and then mixing for a further 15 seconds.

A sedimentation rate in cm/minute is calculated and shown for each total polymer dose in table 9.

TABLE 9

| Polymer solution | Sedimentation rate (cm/min) | | | |
|---|---|---|---|---|
| | 3 mg/l | 4 mg/l | 5 mg/l | 6 mg/l |
| 0.05% | 10.2 | 14.6 | 20.7 | 38 |
| 0.05% two stage addition | 12.7 | 20 | 29.2 | 42.1 |
| 0.05%:0.25% (50:50) two stage addition | 20.2 | 33.4 | 38.5 | 47.1 |
| 50:50 mixture of 0.05% solution and 0.25% solution | 15.7 | 32.1 | 43.7 | 45.2 |

Figure 6:
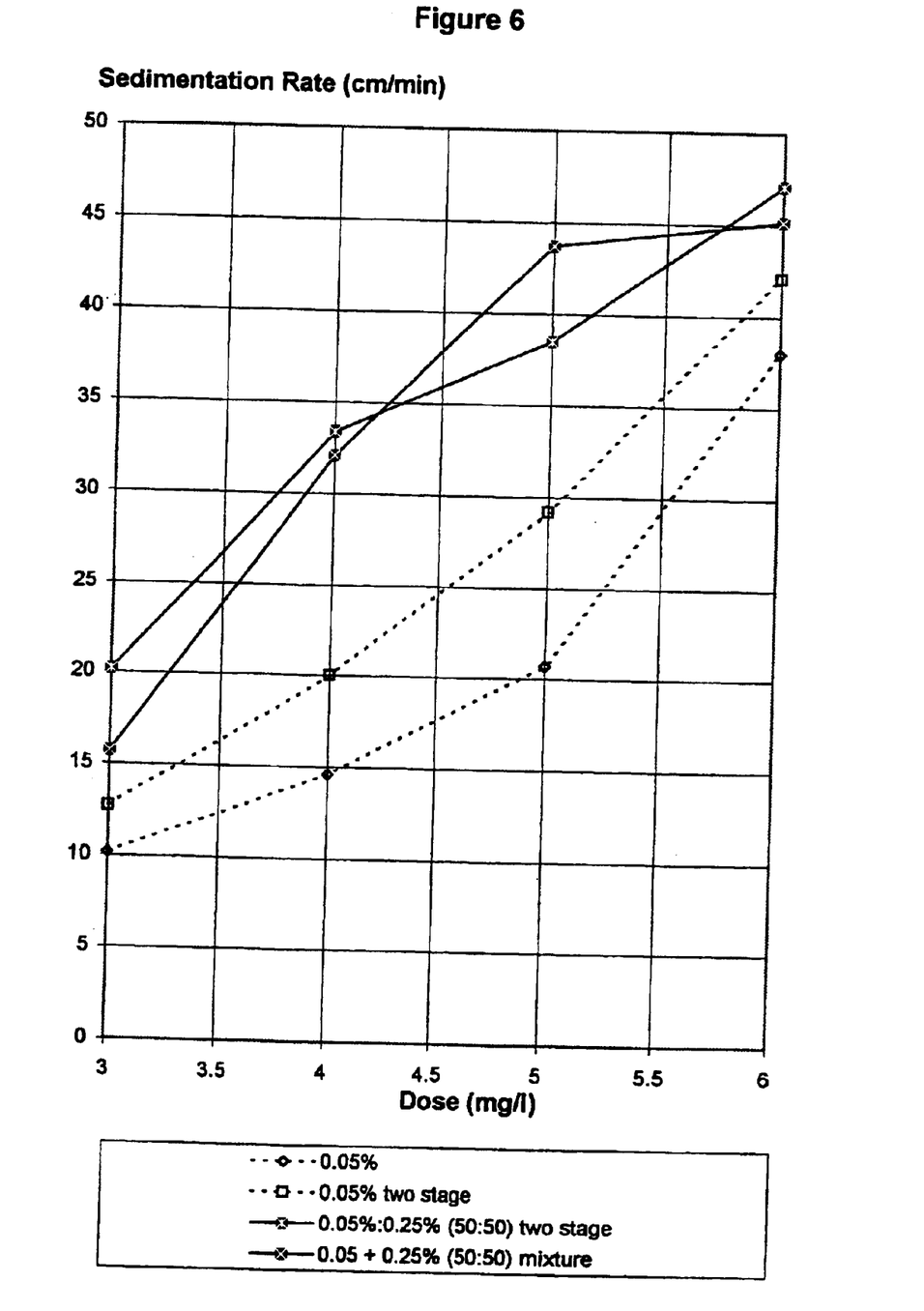

The results show that the mixed concentrated and dilute polymer solutions and two stage addition of dilute and concentrated polymer solutions out perform the single dose of dilute polymer solution or the two stage dose of dilute polymer solution. This is clearly visible from the plots shown in FIG. 6.

What is claimed is:

1. A process of flocculating and dewatering an aqueous suspension of suspended solids comprising, introducing into the suspension an aqueous composition comprising,
   (a) a concentrated aqueous polymeric flocculant solution having a concentration above about 0.3% by weight and
   (b) a dilute aqueous polymeric flocculant solution having a concentration below about 0.3% by weight, characterised in that the concentrated and dilute polymeric flocculant solutions are introduced into the suspension substantially simultaneously and the dilute solution and concentrated solution exist as substantially discrete components of a non-homogeneous composition, to flocculate said suspended solids, and dewatering said aqueous suspension.

2. A process according to claim 1 in which the aqueous composition comprises,
   (a) 1 to 80%, by weight of the concentrated aqueous solution of polymeric flocculant and
   (b) 20 to 99%, by weight of the dilute aqueous solution of polymeric flocculant.

3. A process according to claim 1 in which the aqueous composition comprises,
   (a) 1 to 40%, by weight of the concentrated aqueous solution of polymeric flocculant and
   (b) 60 to 99%, by weight of the dilute aqueous solution of polymeric flocculant.

4. A process according to claim 1 in which the dilute aqueous polymeric flocculant solution comprises a cationic polymer, an anionic polymer or a nonionic polymer.

5. A process according to claim 1 in which the concentrated aqueous polymeric flocculant solution has a concentration of polymeric flocculant of between 0.4 and 1.0%, by weight.

6. A process according to claim 1 in which the concentrated aqueous polymeric flocculant solution comprises a cationic polymer, an anionic polymer or a nonionic polymer.

7. A process according to claim 1 in which the polymeric flocculant dissolved in the concentrated solution is either co-ionic with the polymeric flocculant dissolved in the dilute solution or non-ionic.

8. A process according to claim 1 in which polymeric flocculant dissolved in either the dilute solution or the concentrated solution Is cationic and has been formed from a monomer or blend of monomers comprising at least one cationic monomer selected from the group consisting of quaternary ammonium and acid salts of dimethylaminoethyl (moth) acrylate, quaternary ammonium and acid salts of dimethylaminoethyl (meth) acrylamide and diallyldimethyl ammonium chloride.

9. A process according to claim 1 in which the polymeric flocculant dissolved in either the dilute solution or the concentrated solution is anionic and has been formed from a monomer or blend of monomers comprising at least one anionic monomer selected from the group consisting of (meth) acrylic acid, 2-acrylamido-2-methylpropane sulphonic acid, alkali metal and ammonium salts thereof.

10. A process according to claim 1 in which the polymeric flocculant dissolved in either the dilute solution or the concentrated solution is nonionic and has been formed from acrylamide or methacrylamide.

11. A process according to claim 1 in which the polymeric flocculant dissolved in each of the dilute and concentrated aqueous solutions is a cationic copolymer of acrylamide and at least one cationic monomer selected from the group consisting of quaternary ammonium and acid salts of dimethylaminoethyl (meth) acrylate, quaternary ammonium and acid salts of dimethylaminoethyl (meth) acrylamide and diallyldimethyl ammonium chloride, having an intrinsic viscosity of at least 4 dl/g.

12. A process according to claim 1 in which the aqueous composition comprising the dilute aqueous solution of polymeric flocculant and the concentrated solution of polymeric flocculant is formed by introducing the concentrated solution of polymeric flocculant into a flowing stream of the dilute aqueous solution of polymeric flocculant.

13. A process according to claim 12 in which the dilute aqueous solution of polymeric flocculant is formed by diluting a flowing stream of the concentrated aqueous solution of polymeric flocculant with dilution water.

14. A process according to claim 1 in which the aqueous composition is formed by,
   (a) passing said concentrated solution of polymeric flocculant to a dilution where the solution is combined with dilution water to form a dilute solution,
   (b) passing the diluted solution through a mixing stage, selected from pumping and screening stages, and (c) introducing said concentrated solution of polymeric flocculant into the dilute aqueous solution to form said aqueous composition.

15. A process according to claim 14 in which the concentrated polymeric flocculant solution, which is diluted to form the dilute polymeric flocculant solution in step (a) is drawn from the same reservoir of concentrated polymeric flocculant solution introduced into the dilute solution in step (c).

16. A process according to claim 14 in which the concentrated solution of polymeric flocculant in step (a) is drawn from a different reservoir of concentrated polymeric flocculant solution introduced into the dilute solution in step (c).

17. A process according to claim 1 in which the dewatering process is selected from the group consisting of dewatering sewage sludge, dewatering a mineral suspension, dewatering a paper mill sludge, dewatering a deinked cellulosic sludge and a papermaking process.

* * * * *